D. SWANK.
Velocipede.
No. 92,668. Patented July 13, 1869.
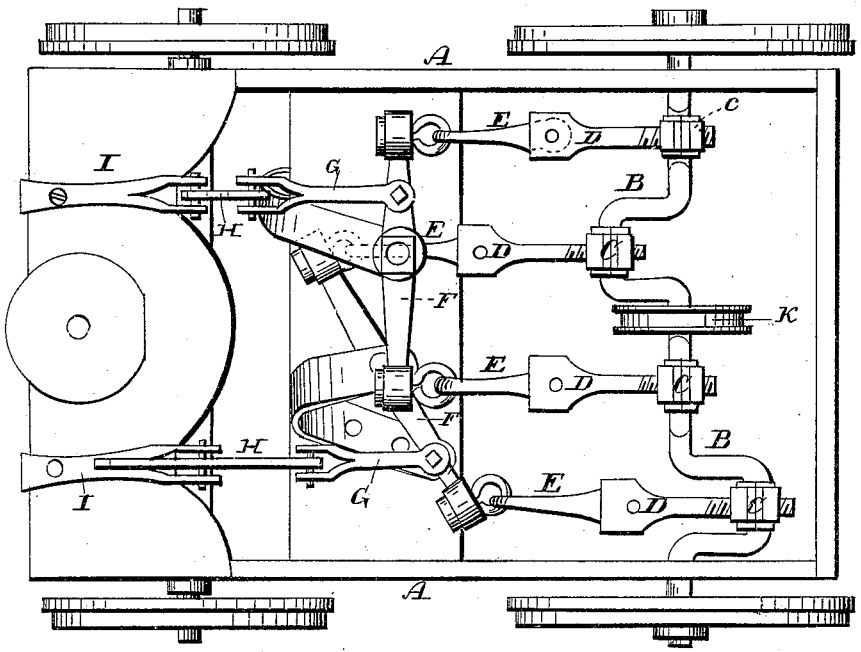
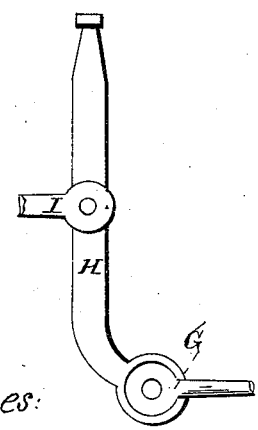
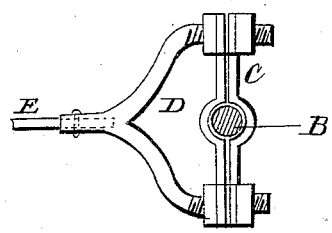
Witnesses: Inventor:

United States Patent Office.

DANIEL SWANK, OF NEWTON, IOWA.

Letters Patent No. 92,668, dated July 13, 1869.

---

APPARATUS FOR PROPELLING CARRIAGES.

---

The Schedule referred to in these Letters Patent and making part of the same.

---

*To all whom it may concern:*

Be it known that I, DANIEL SWANK, of Newton, in the county of Jasper, and in the State of Iowa, have invented certain new and useful Improvements in the Method of Applying Lever-Power; and do hereby declare that the following is a full, clear, and exact description thereof, reference being had to the accompanying drawings, and to the letters of reference marked thereon.

The nature of my invention consists in the construction and arrangement, and of a method of applying levers to operate vehicles or machinery.

Figure 1 represents a plan view of my device as applied to a vehicle.

Figure 2 is a view of one of the arms by which the levers are operated.

Figure 3 represents a side view of one of the forked arms.

Letter A represents the frame of an ordinary wagon or car, to which my devise is attached.

The axle B, to which the two hind driving-wheels are fastened, is formed so as to make four cranks, all of which are inside of the frame A.

Clasping each one of these four cranks, are two metal plates, C, placed in an upright position, as seen in fig. 3, and held firmly together by nuts screwed upon the ends of the forked arms D.

Passing through the top and bottom of these plates C, are the two ends of the forked arms D, which are cut like screws, and have nuts screwed upon them, upon each side of the plates.

The opposite ends of these arms from the fork have slots cut in them, so that they can be pivoted to the rods E, whereby they are joined to the ends of the levers F.

Pivoted to two supports or braces, secured to the cross-piece in the bottom of the frame, are two levers, by means of which the power is imparted to set the cranks revolving.

At each of their ends, a staple or hook is passed through, so that the rods E can be readily attached to them.

As these hooks or staples are made to pass entirely through the levers, and then only secured by a mere bolt, they can be readily removed, and thus either lever can be used alone.

Bolted loosely to the outer ends of these levers, there are two rods, G, both ends of which have slots cut in them.

In the opposite ones from the levers, the lower ends of the handles H are pivoted.

About half way up, these handles are again pivoted to braces, which are secured upon the cross-piece at the front end of the wagon.

These braces I have slots cut in one end, so that the handles H can be inserted, and then secured by means of a bolt passing through, so that the one sitting upon the seat can work them backward and forward.

In case this power should be desired to be applied to propelling machinery, there is a pulley attached to the axle B, so that a belt can be passed over, and thus the power can be applied in a twofold manner.

Having thus described my invention,

What I claim, and desire to secure by Letters Patent, is—

1. The crank-axle B, in combination with the plates C, when attached in the manner described, forked arms D, and rods E, when used in the manner specified.

2. The forked arms D, when their prongs are cut like screws upon their ends, and made to secure the plates C, as set forth, and have their end slotted, so as to receive the connecting-rods E, in the manner and for the purposes described.

3. The double levers F, and double slotted rods H, in combination with the handles H and braces or supports I, when used in the manner and for the purpose set forth.

4. The crank-axle B, forked arms D, plates C, rods E and H, levers F, and handles H, when all are arranged and operated in the manner and for the purpose specified.

In testimony that I claim the foregoing, I have hereunto set my hand, this 24th day of March, 1869.

DANIEL SWANK.

Witnesses:
A. K. CAMPBELL,
JOHN MEYER.